Jan. 2, 1951 L. F. McDONALD ET AL 2,536,883
UNLOADING DEVICE
Filed April 6, 1949
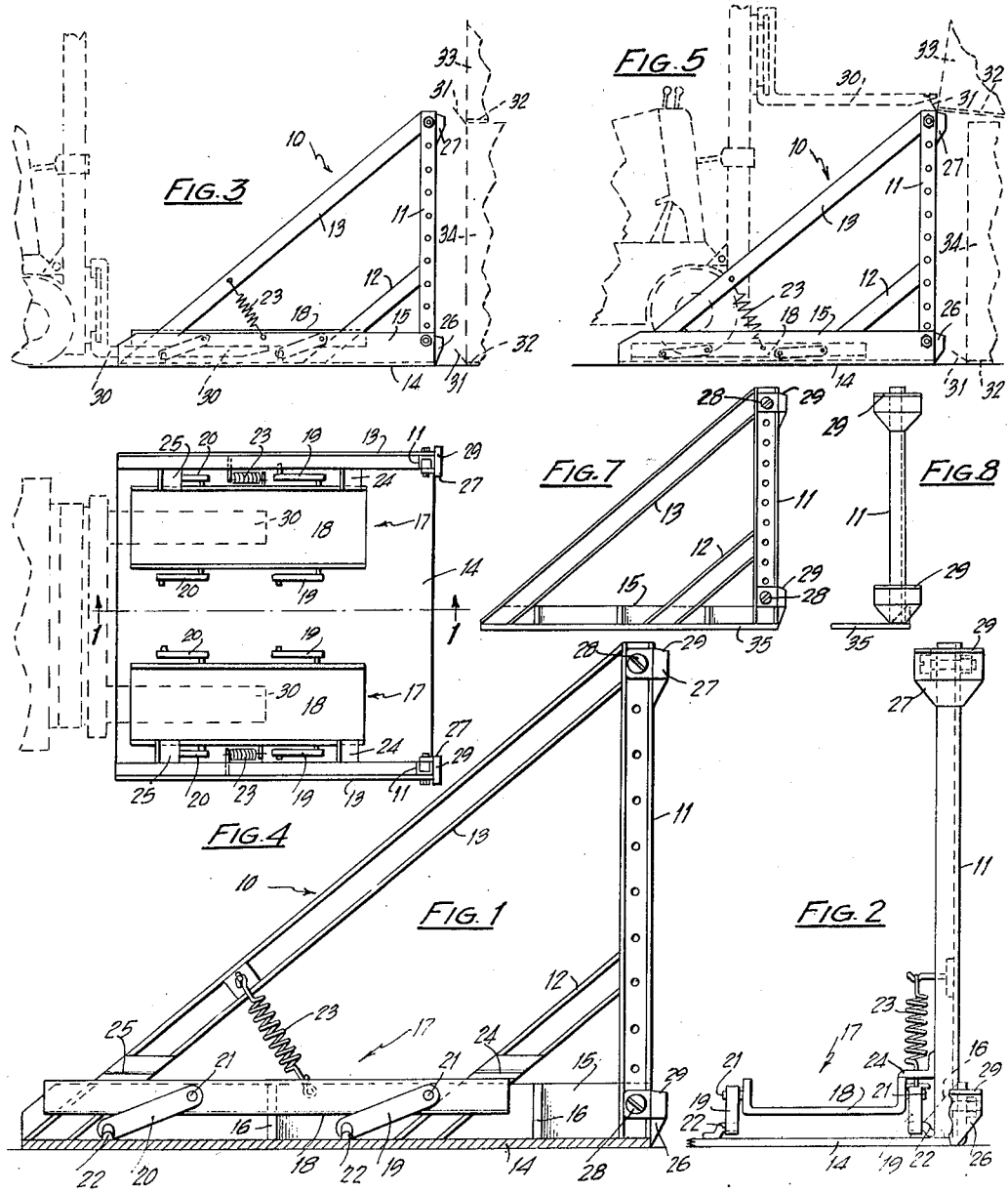
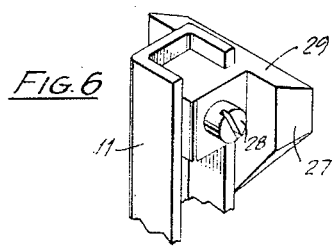
Inventors
Lawrence F. McDonald
Charles J. Grace
by
Their Attorneys Patented Jan. 2, 1951

2,536,883

UNITED STATES PATENT OFFICE 2,536,883

UNLOADING DEVICE

Lawrence F. McDonald, East Greenbush, and
Charles J. Grace, Slingerlands, N. Y.

Application April 6, 1949, Serial No. 85,814

8 Claims. (Cl. 214—44)

This invention relates to an auxiliary unloading device adapted to be used in conjunction with an industrial fork-lift truck for the purpose of unloading freight cars containing "unit loads" in which a block or blocks of goods, or containers are fastened together by the use of flat steel or round wire strapping, or by the use of non-setting "palletizing" glue placed between the containers.

Heretofore, it has been customary to place such loads on conventional type pallets. One such pallet is the well-known hard wood pallet in which cross boards are fastened to the narrow edges of spaced-apart stringers, to provide a raised platform, whereby the fork of a truck can readily pass thereunder to pick up the load together with the pallet. Another type of pallet, perhaps not so well known, is the so-called "expendable" pallet consisting of a sheet of heavy corrugated board to which built-up legs of corrugated board, or other materials, are secured to maintain the same in elevated position, so that the fork of a truck can pass thereunder to pick up the load and the pallet. The use of lift trucks and hard wood pallets has produced tremendous savings in the handling of merchandise within an industrial plant or warehouse, but it has not generally been possible to extend these savings to the shipment of goods in freight cars, nor has the use of expendable pallets solved the problem for the following reasons:

1. Hard wood pallets are too expensive to risk loss in transit and return;

2. The freight rate on such pallets is the same as goods they carry;

3. The return freight is excessive because the pallets carry a high rate;

4. Expendable pallets are also relatively expensive; and

5. Expendable pallets break down too often in transit, and create a hazard by tending to topple when piled upon each other.

However, another type of pallet, which we have invented having lifting handles projecting from a marginal edge of a sheet of material, for example, corrugated board can be utilized to advantage. With such a pallet, the goods need not be maintained in spaced relation with respect to the floor. Such a pallet is lifted to an inclined position by engaging the handles with the fork of the lift truck, blocking it in this position, and passing the fork thereunder to lift the same with the load thereon when the shipment of a unit load reaches the consignee. This type of pallet forms the subject matter of another patent application Serial number 85,815 filed April 6, 1949 by us concurrently herewith.

A principal object of the invention is the provision of an auxiliary unloading device adapted to be used in conjunction with a fork-lift truck, whereby unit loads can be shipped in freight cars without the use of conventional hard wood or expendable pallets.

Another object of the invention is the provision of an auxiliary unloading device for fork-lift trucks for unloading goods supported on a novel type of sheet pallet provided with lifting handles along a marginal edge thereof.

Another object of the invention is to provide such a device especially adapted for unloading goods resting directly on the floor of the car, as well as for unloading stacked goods, in which such pallets as those above described have been utilized.

Another object of the invention is the provision of such a device comprising right and left unloading brackets, adapted easily and readily to be moved into unloading position.

Another object of the invention is the provision of such a device for unloading freight cars by means of a fork-lift truck, wherein the device can be picked up by the fork of the truck and placed in position for unloading purposes.

Other objects of the invention will in part be obvious and in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing in which:

Fig. 1 is a transverse elevational view taken along the line 1–1 of Fig. 4;

Fig. 2 is a front elevational view of Fig. 1;

Fig. 3 is a side elevational view of the device, looking toward the right hand bracket, as having been picked up and placed in unloading position by a fork-lift truck, partially shown in dotted lines;

Fig. 4 is a plan view of Fig. 3;

Fig. 5 is a side elevational view of the device, similar to that shown in Fig. 3, illustrating an initial step of an unloading operation;

Fig. 6 is a perspective view of an adjustable supporting element attached to the top of a fragment of a vertical bracket member;

Fig. 7 is a side elevational view of a modified form of the invention; and

Fig. 8 is a front elevational view of Fig. 7.

Referring more particularly to the drawing, a vertical bracket is indicated generally at 10, as in Fig. 1. This view shows only the left bracket on the left side of the device and since the various parts are the same as the right bracket, similar numerals will be applied to similar parts in the various views.

A vertical brace 11, preferably of channel iron construction, is supported in position by struts 12 and 13 secured in any suitable manner to a bed plate 14 along one marginal edge thereof. A reinforcing plate 15 is secured across the bottom of the vertical brace 11, the struts 12 and 13, and the bed plate 14. The plate 15 is further reinforced by gussets 16 connected to the plate 14.

Along the opposite side of the bed plate, is a similar bracket secured in the same manner. Both brackets are spaced apart in parallel relation a distance sufficient to permit a fork-lift truck to pass therebetween.

A pivotally-mounted mechanism is indicated generally at 17 overlying the bed plate 14. The mechanism preferably comprises a pair of troughs 18. These troughs are slightly wider than the front driving wheels of a fork-lift truck and are so arranged that they are in alignment with the wheels. Troughs are utilized as a practical matter although it will be understood that plates instead of troughs can also be used. In fact, a single plate, or single trough, extending between the brackets 10 is contemplated.

Each trough is supported in part by front and rear links 19 and 20, pivotally mounted on pins 21 secured to the sides of the trough, and to pivot studs 22 secured to the bottom of the bed plate 14. Each trough is held in raised position by means of a spring 23 secured thereto and to the strut 13. Each trough is limited in its upward movement by stops 24 and 25 secured to the struts 12 and 13 respectively.

On the braces 11 are lower and upper stop members 26 and 27 respectively. Each upper member 27 is vertically adjustable by means of a screw or pin 28 which cooperates with openings in the channels. The lower stop member preferably is secured in position although it may also be made adjustable if desired. In fact, one stop member can be utilized to perform the functions of both members since they cannot be operated at the same time as will appear hereinafter.

The stop members preferably are beveled as at 29 to support loads in an inclined position when the device is in operation.

When it is desired to unload a freight car, the fork 30 of the truck can be passed underneath the troughs and the entire unloading device picked up and carried to a position in front of the load which it is desired to unload from the car, as indicated in Fig. 3.

Thereafter, the truck is run upon the trough 18 of the mechanism 17 and the weight of the truck will cause the mechanism to collapse. That is, the troughs 18 will come to rest on the bottom of the bed plate 14 against the action of the spring 23. The truck is then advanced along the troughs to a position indicated, for example, in Fig. 5 where the unloading of stacked goods is shown. The weight of the truck will firmly hold the device in braced and rigid position.

To unload stacked goods, the fork 30 is raised so that the edges thereof, which are suitably notched or creased, will engage the wire handle, or loop 31, of the pallet 32 and raise the same to inclined position. The load is then pulled forward by moving the truck rearwardly, and permitted to come to rest on the inclined surface 29 of the supporting elements 27. Thereafter, the fork of the truck is lowered and then advanced until it passes a sufficient distance underneath the pallet to enable the fork to be raised and to elevate the pallet and load to a desired position above the vertical brace 11 so that the truck can be backed away and the load deposited elsewhere.

As soon as the truck has left the troughs 18, the mechanism 17 will be retracted to normal position by the spring 23, and ready to be picked up by the fork of the truck to be moved elsewhere if desired.

However, if the operator wants to move the load supported directly on the floor of the car, the truck should remain in position and the above described operation repeated by picking up the bottom load 34 and raising it to an inclined position on the bottom supporting elements 26. Thereafter, the fork of the truck is passed underneath the load, raised to an elevated position sufficient to clear the tops of the vertical braces 11, and the load deposited elsewhere.

The modification shown in Figs. 7 and 8 is identical with that above described with the exception that there is lacking a mechanism 17 such as that described above. Also, the bed plate does not connect right and left brackets together. That is, Fig. 8, for example, shows a left bracket having a bed plate 35 which is only sufficient in width to accommodate the front left wheel of the lift truck. A right bracket is utilized in connection with the left bracket so that a pair of separable brackets are adapted manually to be placed in position. Both brackets should be made of a light weight material such as aluminum or magnesium.

In use, each bracket is placed in position in front of a load to be removed, whether it be a stacked load or single unit resting immediately upon the floor, so that a truck can be run thereon with its front wheels resting upon the bed plates 35 in order that the weight of the truck will hold each bracket in rigid and fixed position. Thereafter, the same unloading operation above described can be carried out.

Each bed plate 35, described in connection with Figs. 7 and 8, should at least be equivalent to the length of the fork plus the distance to the center of the front wheel.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. An auxiliary device for a fork-lift truck, adapted for use in unloading freight cars by removing a load of goods from the floor thereof, or by removing a load stacked upon a load resting on the floor, and wherein said goods are supported on a pallet having a lifting handle connected thereto along a marginal edge thereof adapted to be engaged by the fork of the truck; which comprises substantially vertical means adapted to be disposed adjacent each side of the truck and directly in front of said goods in spaced relation thereto; a base member connected to the bottom of said means in line with the wheels of the truck, and adapted to support the weight thereof; and load-supporting elements connected to said means and projecting therefrom toward said load; whereby the truck can be advanced so that its front wheels rest on the base members to enable the fork to raise the load, by said handles, temporarily to an inclined position on said elements, and thereafter to permit the fork to pick up the load by passing underneath said pallet and load supported thereon.

2. A device of the character defined in claim 1, and wherein said means comprises right and left bracket members adapted to be disposed adjacent the right and left side of said truck.

3. A device of the character defined in claim 1, and wherein said base member comprises a bed plate which is of a length at least equivalent to the length of the fork plus the distance to the center of the front wheels of the truck.

4. A device of the character defined in claim 1, and wherein said supporting elements are vertically adjustable.

5. In an auxiliary device for a fork-lift truck, adapted for use in unloading freight cars by removing a load of goods from the floor thereof, or by removing a load stacked upon a load resting on the floor, and wherein said goods are supported on a pallet having a lifting handle connected thereto along a marginal edge thereof adapted to be engaged by the fork of the truck; comprising substantially vertical unloading means spaced apart to accommodate a fork-lift truck therebetween, said means being connected by a base member; and a pivotally mounted retractable mechanism normally overlying said base member in spaced relation thereto; whereby the fork of said truck can be inserted underneath said mechanism so that the entire device can be lifted and placed in unloading position, and said mechanism being adapted to accommodate the wheels of said truck and to come to rest on said base member because of the weight of the truck as the latter is moved to unloading position thereon.

6. A device of the character defined in claim 5, and wherein said mechanism comprises a spring-retracted platform held in spaced relation over said base member.

7. A device of the character defined in claim 5, and wherein said mechanism is supported in spaced relation above said base member by oppositely disposed links pivotally connected thereto and to said base member.

8. A device of the character defined in claim 5, and wherein said mechanism comprises a pair of oppositely-disposed troughs, each of which is spring-retracted to hold it in raised position, and each of which has supporting links pivotally connected to the front and rear ends thereof and to the base member.

LAWRENCE F. McDONALD.
CHARLES J. GRACE.

No references cited.